Aug. 30, 1932.   C. W. HANSELL   1,874,979
PHASE MULTIPLIER AND MODULATOR
Filed Aug. 17, 1927   2 Sheets-Sheet 1

INVENTOR
CLARENCE W. HANSELL
BY *Ira J. Adams*
ATTORNEY

Patented Aug. 30, 1932

1,874,979

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

PHASE MULTIPLIER AND MODULATOR

Application filed August 17, 1927. Serial No. 213,590.

This invention relates to a phase multiplier and modulator, and to a method and means for obtaining corkscrew radiation for the elimination of fading.

Various methods for eliminating fading have been suggested, including wobbling the directivity of a directively emitted wave, or varying the plane of polarization of the transmitted wave, at frequencies lower than the transmission frequency. These methods require the use of some means to so distribute energy to the various antennæ employed that they will be excited successively, rather than simultaneously, for otherwise only a stationary resultant will be obtained. For gradual energy change, constant total load, and uniform wobble or rotation, it is desirable that the amplitude of energization of the individual antennæ vary sinusoidally, so that only the maxima of the wave trains follow in cyclic succession, and to do this is an object of my invention. This I accomplish by separately modulating portions of the transmission energy with each of the single phase components of polyphase energy of a relatively lower frequency, and then supplying the modulated portions of the transmission energy to the separate antennæ, which may differ in plane of polarization, or which may be directive and differ in directivity, or be directive in a single direction and have different planes of polarization, or which may be directive in different directions and have different planes of polarization.

Inasmuch as the modulating frequency, while it may be substantially lower than the transmission frequency, should itself be a relatively high frequency, it may be desirable that it be produced from a high frequency source such as a vacuum tube oscillator, Alexanderson alternator, or other single phase source, which requires that polyphase energy be obtained from single phase energy. This may be accomplished by using suitable inductive and capacitive reactances of proper magnitude relative to resistances to give portions of the single phase energy the necessary phase displacement to result in polyphase output. Since the polyphase energy is to be used to modulate the transmission energy, thereby requiring modulating means which preferably may take the form of electron emission tubes, and because these tubes are effective resistances in their circuits, they may be used as the phase modifying resistances. Accordingly it is a further object of my invention to provide a phase multiplier in which the phase modifying resistances are themselves the useful load.

The invention is described in the following specification, which is accompanied by drawings in which Figure 1 is a wiring diagram explanatory of my invention;

Figure 8:
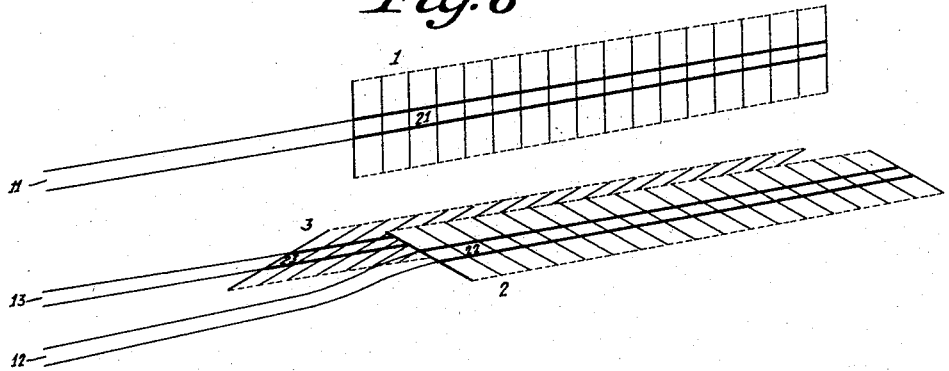

Figure 8 indicates one form of antenna system applicable to my invention.

Figure 1:
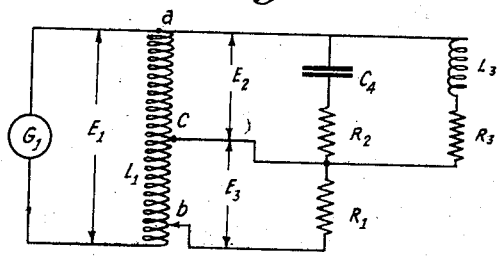

Referring to Figure 1 a source of potential $E_1$ is connected across an inductance $L_1$. Parallel branch circuits $C_4$, $R_2$, and $L_3$, $R_3$ are connected across the points $a$ and $c$ of the inductance $L_1$, between which there is a potential $E_2$. A resistance $R_1$ is connected across points $b$ and $c$ of the inductance $L_1$, between which there is a potential $E_3$. To obtain a three phase energy supply the reactances of $C_4$ and $L_3$ are each made equal to the product of the resistances and the tangent of 60°, whereby the three current vectors are displaced 120°, since $E_3$ is in phase opposition to $E_2$.

Figure 2:
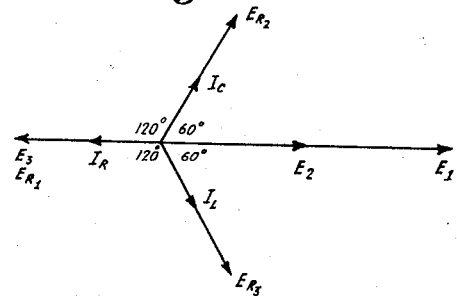
Figure 2 is a diagram showing vectorially the current and potential relations in Figure 1.

These relations may be explained with the aid of the vector diagram in Figure 2, in which the vector $E_1$ represents the applied potential $E_1$, while the vector $E_2$ is the part applied to the capacitive and inductive branches. The potential $E_2$ causes a current flow $I_c$ through the capacitive branch which leads the voltage vector by 60°. The potential $E_2$ also causes an equal current flow $I_L$ through the inductive branch which lags the voltage vector by 60°. The current $I_C$ flowing through the resistance $R_2$ causes a potential drop across the resistance which is in phase with the current and is represented by the vector $E_{R2}$. The current $I_L$ flowing thru the resistance $R_3$ causes a potential drop across the resistance which is in phase with the current and is represented by the vector $E_{R3}$.

The potential $E_8$ is opposite in direction to $E_2$, and is reduced in magnitude to equal the potentials $E_{R2}$ and $E_{R3}$, and which for uniform notation may be designated as $E_{R1}$.

Figure 3:
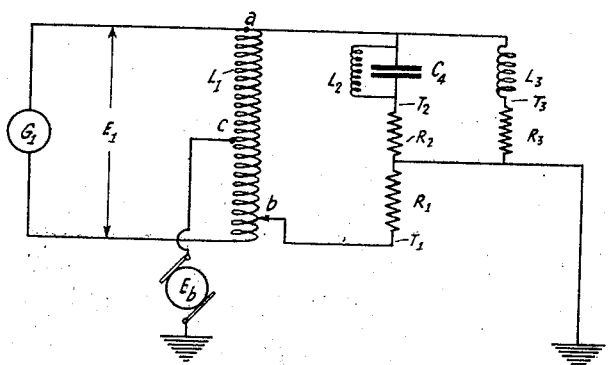
Figure 3 is a wiring diagram further explanatory of my invention.

Figure 3 is quite similar to Figure 1, except that between the point $c$ and the common junction of the resistances $R_1$, $R_2$, and $R_3$ there has been connected a source of direct potential $E_B$. In the actual embodiment of my invention, for the phase modifying resistances $R_1$, $R_2$, and $R_3$ there are used the modulator tubes, and the potential $E_B$ is the normal direct anode potential for the modulator tubes. In order to allow this potential to be applied to the anode of the tube represented by the resistance $R_2$ a radio frequency choke coil $L_2$ is connected in parallel with the phase modifying condenser $C_4$, which may, if desired, be suitably altered in magnitude so that the combined reactance of the condenser and inductance is properly capacitive.

Figure 4:
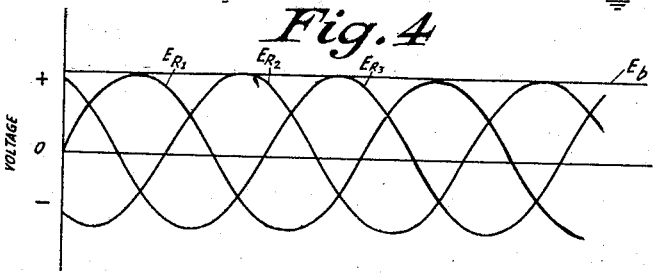
Figures 4 and 5 show the potential relations obtained in Figure 3.
Figure 5:
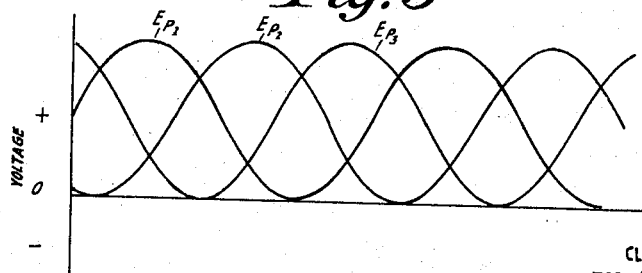

The points $T_1$, $T_2$, and $T_3$ represent the points of connection of the anodes of the modulator tubes $T_1$, $T_2$, and $T_3$, and accordingly the potentials at these points are of interest in order to study the operation of the modulator circuits. Referring to Figure 4 the horizontal line $E_B$ represents the steady positive anode potential which normally would be applied to the anodes of the tubes $T_1$, $T_2$ and $T_3$, were the source $E_1$ cut out of circuit. The applied potential $E_2$, in Figure 2, is preferably of such magnitude that the maxima of the dephased potentials $E_{R1}$, $E_{R2}$, and $E_{R3}$, indicated in Figure 2, will be equal to the steady anode potential $E_B$, as is indicated in Figure 4. The resultant potential applied to the tube anodes will be the instantaneous sum of the alternating and direct potentials, as is indicated by the curves $E_{P1}$, $E_{P2}$, and $E_{P3}$, in Figure 5. It is thus seen that the anode potentials of the modulator tubes vary between zero and a maximum sinusoidally, and that these maxima are displaced 120° in phase.

Figure 6:
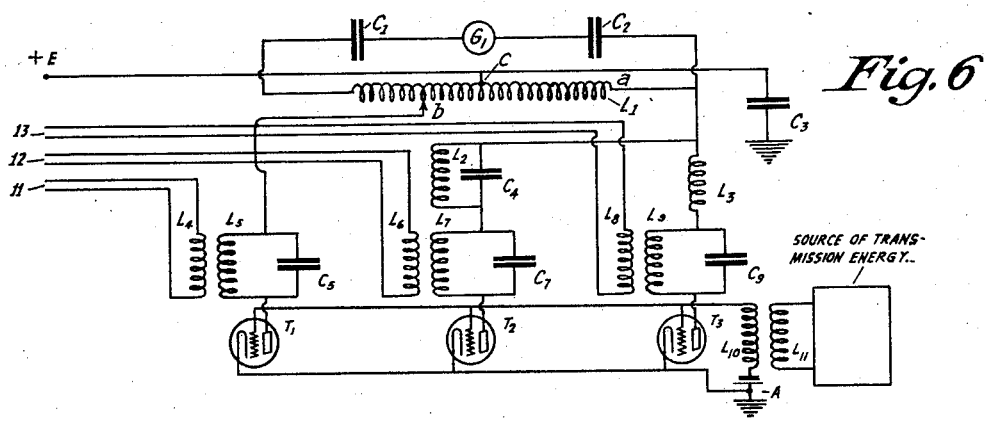
Figure 6 is a wiring diagram of my invention.

Figure 6 may now be considered, and in this figure it will be recognized that $T_1$, $T_2$, and $T_3$ are the three modulator tubes, $G_1$ is a source of single phase modulating potential, $L_1$ is the inductance across which the potentials $E_2$ and $E_3$ are obtained in phase opposition, $L_3$ is a phase modifying inductance, $C_4$ is a phase modifying condenser, and $L_2$ is the radio frequency choke which permits the direct potential from the source $E_B$ to reach the anode of the tube $T_2$.

If $G_1$ is a vacuum tube source it is preferably of the push-pull type, with the point C located at the midpoint of the inductance $L_1$.

The circuit of Figure 3 is slightly modified by the addition of blocking condensers $C_1$, $C_2$, and $C_3$, and the resonant output circuits $L_5 C_5$, $L_7 C_7$, and $L_9 C_9$, which are tuned to the transmission frequency, and which ordinarily, therefore, will be markedly detuned with respect to the modulating frequency of the generator $G_1$. To the inductances of these output circuits the three phase lines 11, 12, and 13 may be coupled by means of the coupling inductances $L_4$, $L_6$, and $L_8$.

The grid circuits of the modulator tubes are connected in parallel with one another, and across an input inductance $L_{10}$ which is in series with a source of grid biasing potential $E_G$. The source of transmission energy of high frequency is connected to the coil $L_{11}$, which is magnetically to the input inductances $L_{10}$.

The phase modifying effect of the ouput circuit may be disregarded because all of the current vectors will be shifted in the same direction, and the difference in the amount of their displacement will be a second order difference, and therefore negligible, or, if desired, their impedance value may be taken into consideration when the phase modifying reactances are selected.

Figure 7:
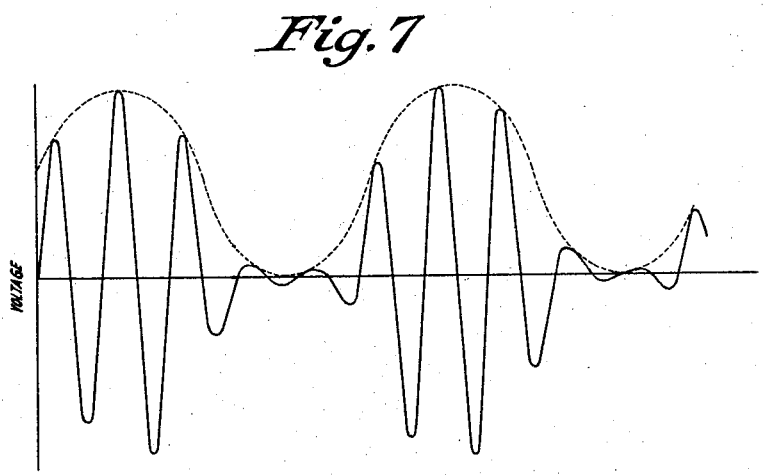
Figure 7 shows the form of output obtained from each phase in Figure 6.

Figure 7 shows a wave of transmission frequency modulated by one phase of the polyphase modulating energy, and it is clear that the actual output from the phase multiplier and modulator will consist of three such modulated high frequency waves, the maxima of which will be displaced 120° in phase.

In Figure 8 there are shown three directive antennæ, 1, 2, and 3, which consist of a series of radiators connected by transmission lines 21, 22, and 23, which in turn are fed from three lines 11, 12, and 13. For a more detailed description of these antennæ my copending application, Serial Number 161,771, filed Jan. 18, 1927, and a copending application of Nils E. Lindenblad, Serial Number 213,566 filed August 17, 1927, may be referred to. In the modification shown in the figure these three directive antennæ are positioned so that their planes of polarization are displaced 120°, and so that their directions of directivity are slightly different. It is clear that the phase multiplier and modulator may be used to obtain an energy supply for use with antennæ which are differently located but focused on a single objective, or which are differently or similarly located and differently directive, or displaced in plane of polarization, or for directive antennæ focused on a single objective while displaced in plane of polarization, as well as for different polarization and different directivity as has been illustrated in Figure 8.

The variation of the plane of polarization will be a uniform rotation of a wave of constant amplitude, for the wave may be represented by a vector which is the resultant of the instantaneous vectors representing the individual antennæ, and the constant length and uniform rotation of such a resultant vector is one of the well known properties of a balanced three phase circuit. By the means here disclosed a true corkscrew wave may be radiated, or a uniform wobble may be obtained, while the load on the energy sources is kept constant, and the energy changes in the antennæ are made sinusoidally, which is a variation of least shock and consequently greatest efficiency.

I claim:

A three phase modulator comprising first, second, and third modulator tubes, an input circuit coupled to the cathodes and control electrodes of the modulator tubes, a source of direct energy for the tube anodes, a source of modulating energy for changing the effective anode potentials, means coupling the modulating source to the anode of the first tube, means coupling the modulating source in reversed polarity thru a capacitor to the anode of the second tube, means coupling the modulating source in reversed polarity thru an inductor to the anode of the third tube, and output circuits for the modulator tubes.

CLARENCE W. HANSELL.